United States Patent

Ehrgott

[15] 3,635,727
[45] Jan. 18, 1972

[54] UNIFORMLY DISTRIBUTING ICE CRYSTALS IN A PARTIALLY FROZEN COFFEE EXTRACT SLUSH

[72] Inventor: Charles Warren Ehrgott, Rumson, N.J.
[73] Assignee: General Foods Corporation, White Plains, N.Y.
[22] Filed: Feb. 24, 1970
[21] Appl. No.: 13,407

[52] U.S. Cl. ..................................................99/71, 99/192
[51] Int. Cl. .........................................................A23f 1/08
[58] Field of Search ..............99/71, 199, 192; 62/58; 259/7

[56] References Cited

UNITED STATES PATENTS

| | | | |
|---|---|---|---|
| 2,685,783 | 8/1954 | Benscheidt et al. | 99/199 X |
| 3,277,667 | 10/1966 | Hedrick | 62/58 X |
| 3,373,042 | 3/1968 | Elerath et al. | 99/71 |
| 3,443,963 | 5/1969 | Simon et al. | 99/71 |

*Primary Examiner*—S. Leon Bashore
*Assistant Examiner*—Alfred D'Andrea, Jr.
*Attorney*—Howard J. Newby, Bruno P. Struzzi and Daniel J. Donovan

[57] ABSTRACT

The ice crystals in a partially frozen concentrated coffee extract slush are uniformly distributed throughout the unfrozen matrix and the apparent viscosity of the slush is reduced by an agitation procedure which facilitates extruding the slush into a cooling zone wherein the slush extrudates of uniform composition are subdivided and frozen to rigid solids. The method includes subjecting the slush to increasing amounts of mixing and shearing forces to uniformly distribute the ice crystals and then extruding the slush through an extruder die block under shear forces lower in magnitude than the shear forces before extrusion such that the slush reverts to a consistency at which the extrudates can be subdivided into pellets.

3 Claims, 1 Drawing Figure

PATENTED JAN 18 1972
3,635,727
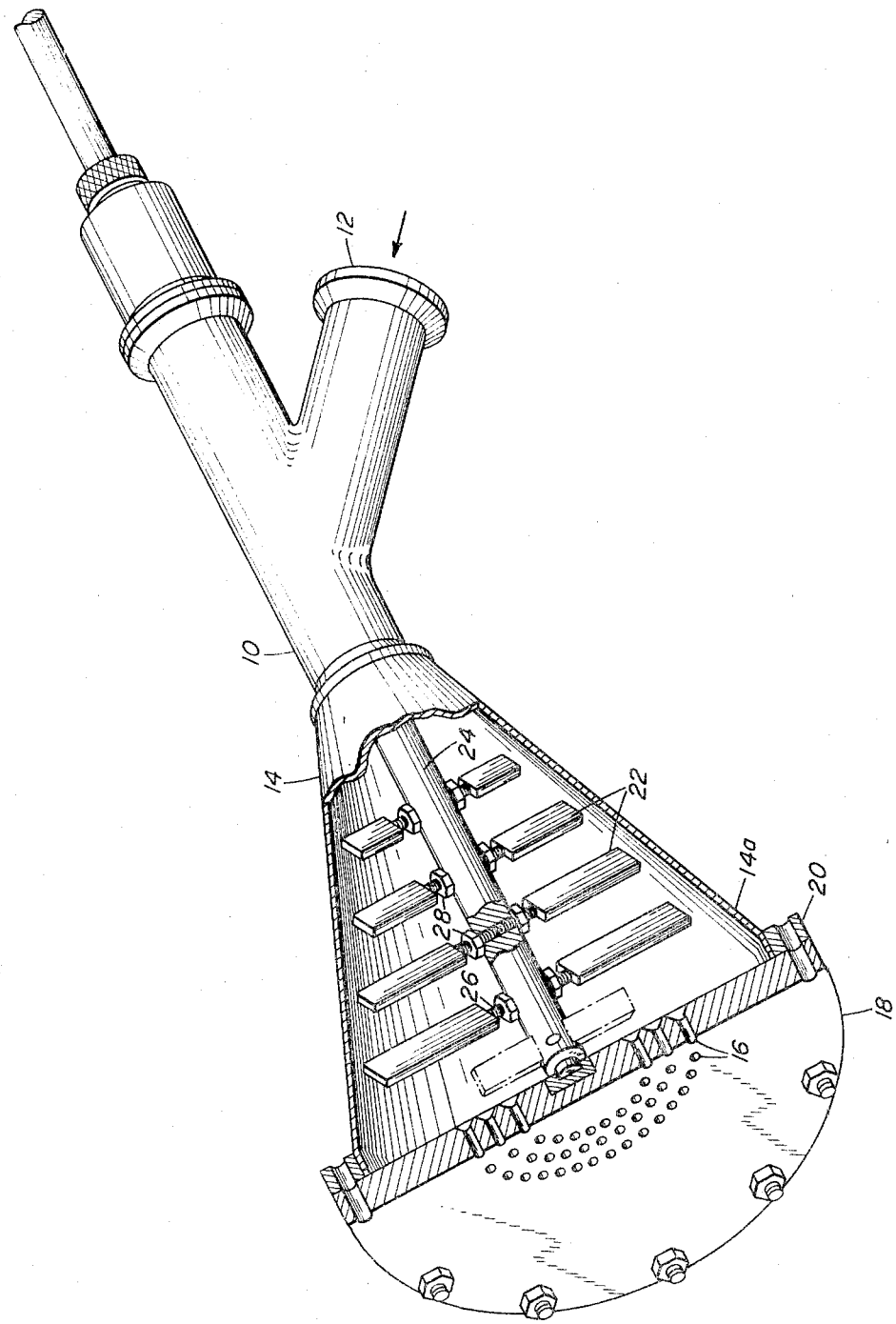
INVENTOR.
Charles W. Ehrgott
BY
Daniel J. Donovan
ATTORNEY

UNIFORMLY DISTRIBUTING ICE CRYSTALS IN A PARTIALLY FROZEN COFFEE EXTRACT SLUSH

BACKGROUND OF THE INVENTION

1. Field of the Invention

This invention relates to an improved, two-stage method of continuously freezing concentrated coffee extract—a critical processing operation for preparing the extract for freeze-drying to soluble coffee solids. More particularly, the invention is directed to a method and apparatus for transferring the semifrozen concentrated extract from a first stage freezing operation to a second stage freezing operation in the form of a homogeneous slush extrudate which can be cut or shaped prior to, or after, being frozen to a rigid state in the second stage freezing operation.

2. Description of the Prior Art

During the recent past, freeze-dried soluble coffee has attained wide consumer acceptance and has become recognized as a high-quality article of commerce.

The cost of producing freeze-dried soluble coffee, compared, with the cost of manufacturing spray-dried "instant" coffee, is relatively high. However, the pronounced improvements in product quality obtained by the freeze-drying technique has created an ever increasing consumer demand for this premium-type coffee and has therefore spurred efforts on the part of manufacturers to effect further improvements and to determine means of lowering processing costs.

The processing step immediately prior to the freeze-drying operation—i.e., freezing the concentrated coffee extract preparatory for freeze-drying, is recognized as being one of the more critical steps in the entire series of operations for producing high-quality freeze-dried coffee and has received much attention by scientists, engineers and others associated with the production thereof.

The manner in which the coffee extract is frozen, prior to dehydration by sublimation, will, to a large extent, determine the quality of the finished product. The freezing technique has an important bearing on aroma content, color and uniformity of the finished product. Additionally, the method in which the extract is frozen and subsequently shaped and reduced in size will influence the porosity, handleability, fines content, and other factors associated with the lyophilization and the overall production costs.

Elerath, et al., (U.S. Pat. No. 3,373,042) have developed a method for freezing a large quantity of aromatic coffee extract which can be freeze-dried at a more efficient rate than by previous known methods without aroma loss while at the same time producing a desirable dark-colored soluble coffee.

Their invention is founded on the discovery that an aqueous extract of soluble coffee solids containing coffee aromas can be partially frozen in a first freezing zone wherein the extract is cooled to above its eutectic point while being continually agitated so as to partially freeze the water in the extract to the extent the extract will retain its shape and form on standing. During the partial freezing of the extract in the first freezing zone, the aromas, oil, coffee solids, and ice crystals are uniformly blended to provide a homogeneous slush-type material for introduction to the second, and final, freezing zone.

The partially frozen extract slush, in the first freezing zone has the consistency of a thick sherbetlike material that will retain its shape and form upon standing while still being sufficiently plastic to be molded or deformed into a desired shape. The partially frozen extract is then deposited in a second freezing zone in a form having adequate surface area for effective freeze-drying, and is cooled below its eutectic point to completely freeze the extract in said form.

It has been suggested that the partially frozen extract be transferred from the first freezing zone to the second freezing zone by extruding it through a die member under sufficient pressure to form an extrudate in the form of a "rope" or multiplicity of "ropes" or "ribbons" which retain their shape and which can be frozen in the second stage freezing zone before or after being cut into short length particles. This method of transferring the slushed extract provides many tangible advantages to the process and product, e.g., a porous surface and a precast shape which promote good freeze-drying efficiency and results in a dark-brown colored soluble coffee product having excellent aroma retention, satisfactory density, and a color similar to that of roasted and ground coffee.

The transfer of the partially frozen extract from a first freezing zone to a second freezing zone by extrusion has not attained substantial commercial acceptance, however, because of the tendency for the ice crystal content of the extract slush to segregate as the slush slowly passes through the unagitated zone of the extruder immediately prior to being extruded through the orifices in the die block.

Additionally, in order to achieve a darker colored product and to reduce freeze-drying costs, the coffee extract can be converted to a more highly concentrated condition concomitant with the freezing operation in the first freezing zone by a freeze-concentration technique. Although freeze-concentration has the advantage of removing a portion of the water which otherwise would have to be sublimated during freeze-drying, it increases the viscosity of the concentrated coffee extract which thereby imposes additional difficulties to transferring the partially frozen extract by an extrusion method to the second freezing zone.

The segregation of ice crystals from the unfrozen matrix of the concentrated coffee extract slush in the substantially quiescent zone of the extruder immediately before the die block causes nonuniformity of extrudate composition which results in undesirable nonuniformity of material composition for freeze-drying. Also the segregated ice crystals progressively block the die orifices thereby creating lower production rates and malfunctioning of the equipment.

Adding to this difficulty, the partially frozen extract, in the form of a highly viscous slush, behaves as a thixatropic fluid and its consistency (or resistance to flow) increases when the shearing stresses incident to agitation are no longer present in the quiescent zone just prior to the point where the slush is about to be urged through the die orifices—the point where the slush should have the minimum resistance to flow or deformation. Both of the aforementioned characteristics of the extract slush—that of ice crystal separation and the inherent thixatropic rheological properties pose major problems to the process of transferring the material from a first freezing zone to a second freezing zone as an extrudate of uniform composition in the form of a multiplicity of rods (sometimes called "ropes" or "ribbons") of firm slush which can be readily cut into particulate pieces suitable for freeze-drying after being completely frozen in the second freezing zone.

Accordingly, there exists a need for a mechanism and method of operation for efficiently and effectively bringing about the continuous transfer of partially frozen concentrated coffee extract as an extrudate in the form of a multiplicity of rods, each having uniformity of content and a physical texture amenable to being cut or chopped into particulates as the extrudate issues from its respective orifice in the extruder die block.

Unexpectedly, in view of the prior art, the above-mentioned problems are satisfactorily solved with the mechanism according to the present invention. The desired continuous transfer of partially frozen concentrated coffee extract from an initial freezing zone to a second freezing zone is achieved by designing the machine to simultaneously maintain uniform dispersion of the ice crystals within the matrix of the partially frozen extract slush and modulate the apparent viscosity of the slush material to a value whereof the slush can be extruded in a continuous uniform manner without blockage of the die plate orifices or other malfunctioning of the extruder.

Consequently, the instant invention represents a significant advance in the important commercial process of continuously freezing coffee extract prior to freeze-drying the extract to a high-quality soluble coffee product.

SUMMARY OF THE INVENTION

Briefly, this invention encompasses an extruder assembly having a unique agitator and barrel associated with the die block wherein the partially frozen concentrated coffee extract slush is subjected to shearing stresses of controlled magnitude and agitation adequate to maintain a uniform ice crystal content throughout the matrix directly prior to being urged through the die block. The essence of the invention resides in the mechanical provisions for maintaining uniform ice crystal dispersion throughout the matrix and for imposing upon the thixatropic slush progressively increasing amounts of shear stress as the slush linearly approaches the upstream surface of the extruder die block.

The rate at which the shear stresses are increased and the magnitude of the shear stresses provided to the slush as it approaches the die block orifices reduces the apparent viscosity of the slush to a value whereof the slush is fluidized to a degree whereby it can be readily extruded into the second freezing zone. In operation, the apparatus of the invention, while assuring uniform dispersion of the ice crystals, can produce shearing stresses of greater magnitude than those imposed upon the slush as it passes through the orifices of the die block and consequently, the slush "relaxes" to a certain extent as it is extruded through the orifices and it has an opportunity to revert to a sufficiently firm condition for being subdivided, as by cutting, into particulates prior to being frozen to a rigid state in the second stage freezing chamber.

It is, therefore, an object of this invention to provide a mechanism which will continuously extrude a partially frozen concentrated coffee extract slush over prolonged periods of time without blockage of the extruder die block orifices.

It is another object of the invention to provide a machine and method of operation for extruding a concentrated coffee extract slush of sufficient rigidity and suitable hardness amenable to being cleanly severed into particulate pieces as the slush issues from the die block orifices in the form of a multiplicity of rods (ropes or ribbons).

It is still another object of the invention to provide a mechanism which will adequately disperse the ice crystals within the matrix of a partially frozen coffee extract concentrate to avoid segregation thereof and assure uniformity of extrudate composition.

It is a feature of the present invention that the improvements in extruder design encompassed therein do not subject the slush to any substantial temperature increase and therefore do not place an additional burden on refrigerator requirements.

The above, and additional objects, features, and advantages of this invention will become more readily apparent from the following detailed description of the preferred embodiment when taken in connection with the accompanying drawing wherein like reference characters are employed to designate like parts in the specification.

BRIEF DESCRIPTION OF THE DRAWING

The FIGURE is a perspective view of the extruder assembly showing the die block and with a portion of the frustoconical-shaped throat section cut away to show the agitator blade assembly.

DESCRIPTION OF THE PREFERRED EMBODIMENT

The ultimate purpose of freezing coffee extract within two refrigeration zones is to be able to shape the frozen material into small discrete particles having a large proportion of surface area mandatory for commercially practical freeze-drying operations. By employing this method in lieu of freezing the extract into large slabs, the frozen particles can be formed without the necessity for grinding with the attendant generation of fine particles which, to say the least, detract from the appearance of the freeze-dried product.

Extruding partially frozen extract as a method of shaping the material, while having considerable commercial potential, has not been a practical operation until the design improvements in the extruder mechanism, encompassed in this invention were realized.

For purposes of this invention, partially frozen extract is prepared in a first freezing zone wherein the extract is frozen to an extent whereof forms a slush which behaves as a thixatropic fluid and, at rest, is capable of retaining its shape and form.

Preferably, the extract is first slowly frozen to a point whereof 5 to 10 percent of the water content forms large ice crystals which may be removed in accordance with freeze-concentration techniques such as by centrifuging or by passing the partially frozen extract over a foraminous member to separate the ice crystals from the bulk of the partially frozen extract.

The concentrated coffee extract, having a coffee soluble solids content ranging from 20 to 45 percent, is then slowly refrozen in the first cooling zone over a period of at least 10 minutes and preferably 15 to 20 minutes to freeze at least 20 percent, and preferably 30 percent to 60 percent of the available water to ice crystals. Experience has shown that best results are obtained when the heat content of the extract is diminished by a controlled amount of 1 to 3 gram calories per ml. of coffee extract per minute, since it is at this rate of cooling that large ice crystals are formed which assure a desirable dark-colored freeze-dried product.

The resultant coffee extract concentrate slush, is pumped from the first freezing zone through suitable piping to the extruder apparatus of this invention.

Referring to the FIGURE, the extract slush is admitted to the extruder 10 at inlet 12 and is urged to pass through the expanding conically shaped throat section 14 and through the orifices 16 constructed in the die block 18 which is secured to the flange 20 at the downstream (wide) end 14a of the throat section 14.

Each of the orifices 16 has a cross-sectional bore diameter of about one-eighth inch and the uniform pattern of orifices in the die block has a total cross-sectional area approximately equal to the cross-sectional area of the inlet 12 of the extruder.

As the partially frozen coffee extract is urged through the expanding frustoconical throat chamber 14 by means of the pump (not shown) toward the orifice 16 of the die block 18, it is continuously agitated by the series of agitated elements 22 connected to, and revolving with, the concentrically located shaft 24 driven by a variable speed drive assembly (not shown). The lengths (and effective areas) of the agitated blades 22 become increasingly greater in the direction of the die block as illustrated in the FIGURE.

The agitator elements (blades) are limitedly adjustable as to length and pitch by means of the threaded connection 26 by which they are attached to the shaft 24 and secured with suitable locking nut 28 arrangement.

Unlike extruders of the prior art, the extruder of the instant invention has an agitated assembly which, by virtue of its structural design and location, assures complete lack of segregation of the ice crystals from the matrix of the slush immediately prior to the slush being urged through the orifices of the die block. Since the agitator blades are adjustable as to length and pitch and their rotational speed is controllable, agitation requirements can be obtained to satisfy variations in slush concentration and viscosity over a wider range of extrusion rates.

Equally important, it is to be noted, in operation, the linear velocity of slush is decreased as it is urged through the expanding conical throat section toward the die block at a uniform volumetric rate. This decrease in linear velocity effect plus the increase in effective agitator blade area produces a substantially uniformly increasing amount of agitation to the slush as it progresses toward the orifices of the die block even though all the blades are fixed to the same shaft and have identical rotational velocities.

In effect, the slush not only progressively traverses the agitator blades more slowly and thereby is contacted for a progressively longer period of time with each agitated blade but also, since the blade areas progressively increase, the slush is contacted with an increasing amount of agitator blade area. Additionally, since the agitator blades are progressively increased in length in the direction of the flow of the slush, the average linear speed of the blades (at the same r.p.m.) increases producing an increase in shear activity on the slush as it approaches the die face. The net result is the concentrated coffee extract slush is progressively subjected to increasing amounts of agitation and shear stresses which culminates at the point where the slush enters the orifices of the die block.

As is well known, the change in the apparent viscosity of a thixatropic material such as partially frozen coffee extract is a function of the degree of shear stress and time.

Accordingly, in the operation of the agitator assembly of this invention, the thixatropic slush is subjected to progressively increasing amounts of shearing stress throughout its residence period in the frustoconical-shaped throat chamber; both factors—shear stress magnitude and period of subjection to shear stress are increased as the slush approaches the orifices of the die block whereat it has the minimum apparent viscosity and accordingly minimum resistance to passage through the orifices of the die block.

By suitable adjustment of the length, number and rotational speed of the agitator blades in accordance with the soluble solids concentration, ice crystal content, and throughput of the partially frozen slush, the extruder assembly of the invention can be made to subject the slush to the proper degree of shear stresses to reduce the apparent viscosity thereof to fluidize the slush for extrusion purposes whereat the same time maintaining the ice crystal content of the fluidized slush uniformly dispersed throughout.

The expanding frustoconical throat chamber 14, in addition to providing space for progressively increasing the lengths of the agitator blades, also provides for a die block having a cross-sectional area sufficient to accommodate an adequate number of orifices of appropriate diameter to assure less shear stresses on the slush as it is urged there through than those shear stresses imposed on the slush by the agitator blades. The net effect being the slush has an opportunity to "relax" as it is urged through the orifices and to revert to a sufficiently firm condition, thereby resulting in extruded rods having the firmness amenable to subdividing as by cutting.

Further to an explanation of the invention, the following example of test runs made with an extruder assembly as described above are included for illustrative purposes.

EXAMPLE I

Coffee extract was freeze concentrated to an average soluble solids concentration of 30.0 percent by weight of the extract. The coffee extract was then further chilled in a continuous scraped surface heat exchanger whereby the resultant slush was cooled to a temperature of about 20° F. prior to being pumped to the extruder assembly. The slush contained 30.2 percent ice crystals by weight of the slush and the matrix had a concentration of 42.8 percent by weight of the coffee solids. The slush was extruded at a rate of 240 lbs./hr. through 80, 3/32-inch orifices in a ⅜-inch thick die block. The orifices were uniformly spaced through out a 3½-inch diameter circular area of the die block. The length of the agitator blades and the rotational speed of the blades were adjusted to modulate the viscosity of the slush to a level whereat the internal pressure within the conical section of the assembly upstream of the die block was 80 p.s.i.g. The slush extrudate of uniform composition was subdivided into ⅛-inch lengths by cutting with an oscillating wire cutter and admitted to the second (−30° F.) freezing zone. The test was conducted for 1 hour with no discernable blockage of the orifices and under continuing successful operational conditions, was terminated.

EXAMPLE II

A test run was performed with the same apparatus and with all conditions identical to those described in example I except the agitator assembly was not rotated. For the first few moments, the extrudate issued from all of the orifices and appeared to be of uniform composition. Shortly thereafter, however, the upper orifices in the die block became plugged and, as the test continued, the blockage of orifices progressed to the point where the extrudate was issuing from less than one-half the openings in the die block; at this point, after about 15 minutes of operation the test was terminated with the pressure in the frustoconical throat section exceeding 160 p.s.i.g.

While the foregoing has illustrated and described what is now contemplated to be the best mode of carrying out the invention, the constructions are, of course, subject to modification without departing from the spirit and scope of the invention. Therefore, it is not desired to restrict the invention to the particular form of construction illustrated and the mode of operation described, but to cover all modification that may fall within the scope of the appended claims.

Having described the invention, what is claimed and desired to be secured by Letters Patent is:

1. A method of converting a partially frozen coffee extract slush comprised of a coffee solids content ranging from about 20 to about 45 weight percent based on the weight of the slush and an ice crystal content distributed therein ranging from about 20 to about 60 weight percent based on the weight of the slush to pellets of uniform composition which comprises;
   a. subjecting said slush to incrementally increasing amounts and magnitudes of coincidentally mixing and shearing forces to uniformly distribute the ice crystals throughout the matrix and fluidize the slush,
   b. extruding the fluidized slush to form rods under conditions whereof the shear forces are of lower magnitudes than the shear forces applied to the slush immediately prior to extruding, whereby the slush is permitted to revert to a consistency sufficiently firm to be subdivided into pellets, and
   c. subdividing the extruded rods into pellets.

2. A method of continuously transferring a partially frozen coffee extract slush comprised of a coffee solids content ranging from about 20 to about 45 weight percent based on the weight of the slush and an ice crystal content ranging from about 20 to about 60 weight percent based on the weight of the slush from a first stage freezing zone to a second stage freezing zone which comprises;
   a. subjecting said slush to incrementally increasing amounts and magnitudes of coincidentally mixing and shearing forces to uniformly distribute the ice crystals throughout the matrix and fluidize the slush, and substantially immediately followed thereafter by
   b. extruding the fluidized slush through an extruder die block into the second stage freezing zone wherein the shear forces exerted upon the slush as it is extruded through the extruder die block are less than the shear forces to which the slush is subjected to during mixing.

3. The method according to claim 2 wherein the slush is extruded through orifices formed in the extruder die block before the slush can completely revert to its original consistency.

* * * * *